Nov. 8, 1927.
H. D. MORTON
1,648,562
ELECTRIC ARC WELDING CONTROL METHOD AND MEANS
Original Filed Jan. 27, 1917
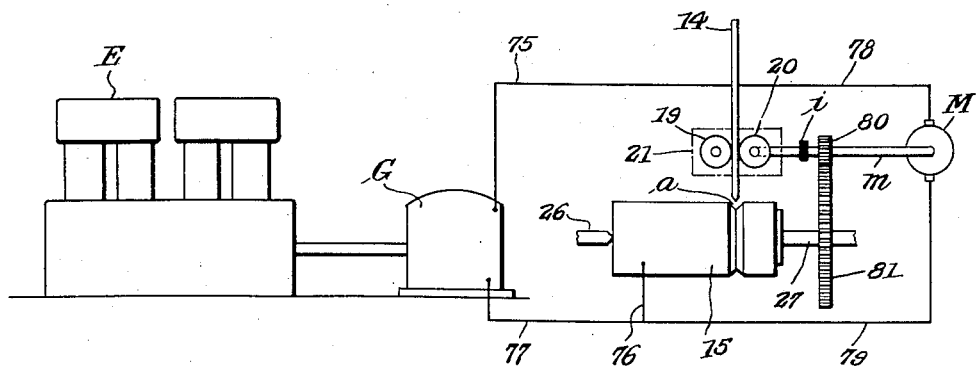
INVENTOR.
Harry D. Morton Patented Nov. 8, 1927.

1,648,562

UNITED STATES PATENT OFFICE.

HARRY D. MORTON, OF NEW YORK, N. Y., ASSIGNOR TO AUTOMATIC ARC WELDING COMPANY, OF DETROIT, MICHIGAN, A CORPORATION OF MICHIGAN.

ELECTRIC-ARC WELDING CONTROL METHOD AND MEANS.

Original application filed January 27, 1917, Serial No. 144,930. Renewed August 14, 1917, Serial No. 186,238. Divided and this application filed August 20, 1927. Serial No. 214,263.

My invention relates to electric arc welding in which a metallic electrode in the form of a strip of wire or welding material is fed to the arc and to the work, which constitutes the other electrode in the circuit.

The present application constitutes a division of my copending application Serial No. 186,238, filed August 14, 1917 (renewal of application Serial No. 144,930, filed January 27, 1917). The present invention is particularly directed to systems and apparatus embodying certain methods and means for effecting control of the welding arc in response to a variable characteristic of the welding circuit.

The following is a description of electric arc welding control methods and means embodying the invention in its present preferred form, but it will be understood that various modifications and changes may be made therein without departing from the spirit of the invention and without exceeding the scope of the claims.

The invention will best be understood by reference to the accompanying drawing wherein is a diagrammatic illustration of a system and means embodying the present invention.

I have found that it is essential for the practical successful operation of this form of electric arc welding that an equilibrium be maintained between the rate of fusing of a strip of welding material and the rate at which said welding material is fed to the arc. I have found that under some conditions and within narrow limits this equilibrium is maintained by the arc itself which has, within certain limits, if the welding strip is continuously fed at a suitable constant rate, a compensatory action as follows: when the arc shortens the resistance decreases, the amperage rises, and this rise in amperage results in the welding strip fusing more rapidly, thereby causing the arc to lengthen. Conversely, if the arc lengthens the resistance is increased, the amperage decreases proportionately, the welding strip is fused more slowly and the continuously moving welding strip restores the arc to its normal length.

While as I have stated this compensatory action of the arc may maintain the necessary equilibrium between the rate of fusing and the rate of welding strip feed, this applies only within relatively narrow limits. I have found in practice that due perhaps to differences in the fusibility or conductivity of the welding strip or of the work it frequently occurs that the range of compensatory action of the arc is insufficient to prevent either a contacting of the welding strip with the work or a rupture of the arc due to its becoming too long.

To overcome this difficulty I have devised a method and system by means of which the equilibrium is maintained within any desired limit by controlling the rate at which the welding strip is fed to the arc.

Referring to the drawing, G represents an electric generator for supplying electric welding current to the welding circuit which includes wire 75, welding strip 14, arc $a$, work 15, wires 76 and 77 to generator G. The wire feed rolls 19 and 20 may be driven by an electric motor M, which motor derives its current from generator G by wires 75, 78 and 79. Generator G is shown as driven by a gasoline engine E.

The feeding mechanism for feeding the metallic welding strip 14 to the work 15 consists of two feed rollers 19 and 20, preferably provided with serrated perimeters, located to receive between them the welding strip 14 which is in the form of a wire. The feed rolls 19 and 20 are rotatably mounted in a welding head 21 which is indicated in dotted lines and provided with suitable guides for the welding strip 14. The feed rolls may be geared together. The work 15 consists of two cylindrical members which are to be joined by an annular weld and in order to do this the work is rotated while the welding strip is fed to the arc at $a$ and while the molten metal formed is being deposited in the groove. The cylindrical members constituting the work 15 are rotatably supported in some suitable manner as by the center 26 and the mandrel 27. The mandrel 27 is connected by the gear 81 to a gear 80 keyed to shaft $m$ of motor M. It will be seen that by this arrangement the motor M drives the feed rolls 19 and 20 and also produces a relative movement between the work and the welding head while the strip 14 is being fed to the work and the molten metal is being deposited on the work. It will also be noted that the feed rolls are driven at a higher speed than the work, since the ratio of the gears 80 and 81 is about as 1 to 7. A fixed relation is preserved between the speed of the welding strip 14 and the rate of movement of the work 15 but the feed of the welding strip 14 is varied because the welding strip can not be made uniform throughout its entire length. Different portions of the welding strip may vary in fusibility or be of slightly differing diameters and the strip will therefore fuse at different rates. When the welding strip 14 fuses very rapidly there is a danger that the arc at *a* may suddenly become so long as to rupture and then in order to start the arc it is necessary to bring the end of the strip 14 again into contact with the work. Conversely, if the feed of the strip 14 to the arc *a* is more rapid than the fusion of the welding strip, the welding strip may be fed against the work and cause a short circuit which is injurious to the work and also requires separating the electrodes to again form an arc.

As heretofore explained the arc *a* has a compensatory action so that within narrow limits the differences in the fusibility of the welding strip 14 will be automatically taken care of by the arc itself. However, in order to take care of the extreme differences of fusibility of the welding strip and irregularities in the contour of the work and thereby maintain the arc I have devised an automatic control mechanism which is responsive to the changes in the amperage of the arc *a* resulting from the varying rate of melting of the welding strip and from irregularities in the contour of the work; and which will alter the rate of feed of the welding strip 14 to correct the variations of the arc and thus compensate for the differences in fusibility of the feeding strip.

In this system my method would be carried out in the following manner. As the arc at *a* shortens its resistance decreases, the amperage increases and as this amperage represents the load upon the prime mover, i. e. the gasoline engine E, the speed of such prime mover will be decreased. This decrease in speed will, of course, result in a corresponding decrease in the speed of the electric generator G driven by said prime mover. This decrease in generator speed results in the lowering of the generator voltage. As the motor M which drives the feed rolls derives its current from the generator G it will be affected by the drop in generator voltage and its speed and consequently the rate of the welding strip feed will be reduced. This decrease in the rate of the welding strip feed will result in the arc being gradually restored to its normal length. This will reduce the load upon the prime mover E, allowing its speed to become normal, restoring the normal speed and voltage of the generator G and consequently of the motor M and of the rate of welding strip feed.

Conversely, if the arc becomes too long its resistance increases, the amperage decreases, the load on the prime mover E decreases, causing the speed of the gasoline engine E together with that of the generator G to increase. This increase in generator speed causes a corresponding increase in generator voltage which results in motor M running at a higher speed, feeding the welding strip 14 to the arc more rapidly and gradually restoring the arc to its normal length. Thereupon the prime mover E regains its normal speed, the generator G its normal voltage and the equilibrium between the rate of welding strip feed and the rate of fusing is restored.

It will be obvious that a steam engine may be employed as a prime mover instead of a gasoline engine E in the system of the present application and the same results will be obtained. Also a series-wound electric motor may be substituted as a driving means for the generator G. In fact, so long as the rolls feeding the welding strip are driven by a motor deriving its current from a generator supplying welding current and driven by any source of power sufficiently responsive in rate of speed to variations in load, i. e. variations in amperage of the arc, my method will be operative.

It is to be understood that the system here shown is merely illustrative and that the well-known arc-starting devices, ballistic resistances, reactances, and manipulating means such as switches, etc., common in the art, are omitted; and that numerous other systems may be employed for carrying out the same method and obtaining the same results.

It is to be understood that when the contour of the work varies, it is necessary to vary the relation between the fusing rate and the feeding rate of the strip. For instance, if an elevation or protuberance in the work is encountered, it then becomes necessary to fuse the strip faster than it is fed. On the other hand, if a depression in the work is encountered, it becomes necessary to feed the strip faster than it is fused.

By the term "a characteristic of the arc" used in the claims, I intend to include such variable, utilizable properties as accompany the operation of an arc, and which are indicative of its normal or abnormal operation, such, for example, as its current, voltage, resistance, length, or energy absorption.

I claim:

1. The method of electrical arc welding which consists in applying molten metal derived from one electrode fed toward the other electrode, varying the speed of the motive power of the generator which furnishes current to the arc, such speed variations being in response to changes in arc length, and correctively altering the feeding rate of the electrode in response to such variations in speed.

2. The method of preventing extinction of a metallic arc during the process of welding which consists in supplying said arc with current from a generator driven by a motive power which responds in speed to variations in arc length, feeding an electrode to the arc, and varying the feeding rate of the electrode in response to changes in speed of such motive power.

3. In a metallic electrode electrical arc welding machine in which the work constitutes one electrode and a welding strip the other electrode, the combination of a generator for supplying welding current, motive power for said generator responsive in speed to changes in arc length, means for feeding the welding strip to the arc, and means responsive to variations in speed of said motive power for changing the feeding rate of the welding strip in order to maintain the arc.

4. In an electric arc welding machine in which a welding strip constitutes one electrode and the work constitutes the other electrode, the combination of an electric motor driving a mechanism for feeding the welding strip toward the work, a generator from which said motor derives its current, which said generator also supplies current to the welding circuit, and a motive power for said generator responsive in its rate of speed to variations in load on the welding circuit.

5. In an arc welding apparatus, a source of electric energy, a welding circuit including said source, a welding strip, work material and a motor, said motor being constructed and arranged to continuously feed the welding strip to an arc struck between the welding strip and the work and being responsive in speed to a variable characteristic of the said circuit.

6. In an arc welding apparatus, a welding circuit including a welding strip, work material and a source of electric energy for supplying current to the arc, and a dynamo-electric motor for feeding the welding strip to the work to maintain the arc length substantially constant, said motor being connected to said welding circuit and being responsive in speed to a variable characteristic of said circuit.

7. In an arc welding apparatus, a source of electric energy for supplying current to the arc, a welding circuit connected to said source in which circuit an arc is adapted to be struck between a welding pencil and work material, and a dynamo-electric motor connected to said source of energy for feeding said welding pencil to the arc, said motor being responsive in speed to conditions in the welding circuit.

8. In electric arc welding wherein the work constitutes one electrode and a welding pencil constitutes the other electrode, the combination of a welding circuit including said welding pencil and work material, a feeding mechanism for said welding pencil, and a rotatable motor connected to the welding circuit and responsive in speed to conditions in said circuit for actuating said feeding mechanism.

9. An apparatus for metallic arc welding of the type wherein the welding arc is maintained between the work and a metallic electrode, and wherein electrode feeding mechanism is arranged to be operated to feed the electrode to maintain the arc, and wherein a variable-speed dynamo-electric machine connected to the welding circuit is arranged to operate said feeding mechanism, characterized by the fact that the speed of said dynamo-electric machine is automatically controlled in accordance with a variable characteristic of the welding circuit.

10. In electric arc welding, a welding circuit including a welding pencil and work material between which an arc is adapted to be struck, feeding mechanism for the welding pencil, and a continuously operating motor connected to said circuit and responsive in speed to variations in arc length for actuating said feeding mechanism.

HARRY D. MORTON.